(12) United States Patent
Sonawane et al.

(10) Patent No.: US 12,137,172 B2
(45) Date of Patent: Nov. 5, 2024

(54) DEFERRED AND SECURE DATA SIGNING

(71) Applicant: ORACLE INTERNATIONAL CORPORATION, Redwood Shores, CA (US)

(72) Inventors: Sachin Vijakumar Sonawane, Foster City, CA (US); Juan R. Loaiza, Woodside, CA (US); Mahesh Baburao Girkar, Los Altos, CA (US); Mark Rakhmilevich, Campbell, CA (US); Wei-Ming Hu, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 365 days.

(21) Appl. No.: 17/584,640

(22) Filed: Jan. 26, 2022

(65) Prior Publication Data
US 2023/0239160 A1    Jul. 27, 2023

(51) Int. Cl.
*H04L 9/32*    (2006.01)
*G06F 16/27*    (2019.01)
*H04L 9/00*    (2022.01)

(52) U.S. Cl.
CPC .......... *H04L 9/3247* (2013.01); *G06F 16/27* (2019.01); *H04L 9/3263* (2013.01); *H04L 9/50* (2022.05)

(58) Field of Classification Search
CPC ....... H04L 9/50; H04L 9/0825; H04L 9/0861; H04L 9/3239; H04L 9/3236; H04L 9/3247; H04L 9/3242; G06F 16/2379; G06F 16/2386
See application file for complete search history.

(56) References Cited

U.S. PATENT DOCUMENTS

| | | | |
|---|---|---|---|
| 9,589,041 | B2 | 3/2017 | Tran et al. |
| 9,747,356 | B2 | 8/2017 | Lu et al. |
| 9,767,178 | B2 | 9/2017 | Srivastava et al. |
| 9,830,372 | B2 | 11/2017 | Rajamani et al. |
| 9,904,722 | B1 | 2/2018 | Shevade et al. |
| 10,191,932 | B2 | 1/2019 | Lehouillier et al. |
| 10,903,991 | B1* | 1/2021 | Craige ................. H04L 9/085 |
| 2017/0270052 | A1* | 9/2017 | Brown ................. G06F 12/023 |

(Continued)

FOREIGN PATENT DOCUMENTS

WO    WO2017/161275    9/2017

OTHER PUBLICATIONS

Cucurull et al., "Distributed Immutalilization of Secure Logs", dated Sep. 17, 2016, Big Data Analytics in the Social and Ubiquitous Context, 16 pages.

(Continued)

*Primary Examiner* — Tae K Kim
(74) *Attorney, Agent, or Firm* — Hickman Becker Bingham Ledesma LLP; Marcel K. Bingham

(57) ABSTRACT

In Secure-Asynchronous Signing, when a record is inserted into a collection of records by a user, the user specifies a registered digital certificate to associate with the record. The digital certificate was previously registered by the user. To subsequently sign a record, the user provides a digital signature. The digital signature is validated using data in the record and a public key of the digital certificate that was associated with the row. Invalid digital signatures are detected and rejected regardless of how long afterward the attempt to sign the row occurs after inserting the row.

22 Claims, 6 Drawing Sheets

(56) References Cited

U.S. PATENT DOCUMENTS

| | | | |
|---|---|---|---|
| 2019/0238525 A1 | 8/2019 | Padmanabhan et al. | |
| 2019/0342149 A1 | 11/2019 | Guo et al. | |
| 2019/0356674 A1 | 11/2019 | Irazabal et al. | |
| 2019/0370793 A1 | 12/2019 | Zhu et al. | |
| 2020/0127849 A1* | 4/2020 | Lakk | H04L 9/50 |
| 2020/0167243 A1 | 5/2020 | Rauh et al. | |
| 2020/0322351 A1* | 10/2020 | Jadav | H04W 12/106 |
| 2020/0374106 A1 | 11/2020 | Padmanabhan | |
| 2021/0014042 A1* | 1/2021 | Sivathanu | H04L 9/0637 |
| 2022/0141028 A1* | 5/2022 | Onnainty | H04L 9/3239 |
| | | | 713/193 |

OTHER PUBLICATIONS

Anonymous: "Two-Phase Commit Protocol—Wikipedia", dated Mar. 4, 2019, https://en.wikipedia.org/w/index.php?title=Two-phase_commit_protocol&oldid=886121497, retrieved on Sep. 28, 2020, 6 pages.

Anonymous: "Raft (computer science)—Wikipedia", dated May 2, 2019, https://en,wikipedia.org/w/index.php?title=Raft _computer_science) &oldid=895121718, dated Sep. 28, 2020, 4 pages.

Muzammal et al., "Renovating Blockchain with Distributed Databases: An Open Source System", Future Generation Computer Systems, Jul. 23, 2018, 27 pages.

Stamos, U.S. Appl. No. 16/932,633, filed Jul. 17, 2020, Notice of Allowance and Fees Due, Jan. 19, 2023.

Stamos, U.S. Appl. No. 16/932,633, filed Jul. 17, 2020, Notice of Allowance and Fees Due, Oct. 6, 2022.

* cited by examiner

BLOCKCHAIN TABLE 124 ("PAYMENTS")

| BC-SEQ | SD-NAME | SD-TIME | ... | SD-AMOUNT | BLOCKCHAIN METADATA | DIGEST | SIGNATURE | CERTID |
|---|---|---|---|---|---|---|---|---|
| 1 | COMP A | 9/21/21 1 PM | | $400.00 | ... | 84FH2 | !KL89 | 1X4 |
| 2 | COMP B | 9/21/21 2 PM | | $1000.00 | ... | %5G*T | W*56F | F54 |
| ... | ... | ... | | ... | ... | ... | ... | ... |
| 3 | COMP A | 9/21/21 2 PM | | $1200.00 | ... | T#65A | Z*%4U | 5X7 |

USER INITIATES A DATABASE SESSION AFTER USER AUTHENTICATION  310

USER SENDS REQUEST TO REGISTER DIGITAL CERTIFICATE TO DBMS  315

IN RESPONSE TO RECEIVING THE REQUEST TO REGISTER THE CERTIFICATE, DBMS GENERATES CERTIFICATE ID AND STORES DIGITAL CERTIFICATE IN DATABASE DICTIONARY IN ASSOCIATION WITH ID AND USER  320

DBMS SENDS DIGITAL CERTIFICATE ID TO DATABASE CLIENT  325

DEFERRED AND SECURE DATA SIGNING

RELATED APPLICATIONS

The present application is related to U.S. patent application Ser. No. 16/932,633, Native Persistent Store Support for Blockchains, filed on Jul. 17, 2020 by James W. Stamos, et al., the entire content of which is incorporated herein by reference.

FIELD OF THE INVENTION

The present invention relates to digitally signing database data in a database system.

BACKGROUND

Blockchains comprise cryptographically hash-linked blocks to assure transactional integrity. Such integrity assures advantages such as non-repudiation and evidence of tampering.

Database management systems (DBMSs) have been enhanced to exploit blockchain technology. One such enhancement is a blockchain table. In a blockchain table, each row corresponds to a block in a blockchain and is cryptographically linked to a previous row representing a previous block in the blockchain. Columns of the blockchain table are included in block content.

An important feature offered by DBMSs for a blockchain table is the ability for a user to digitally sign content of a row in the blockchain table after committing the insert of the row. Signing a row or block content in this way is referred to as asynchronous signing.

Asynchronous signing has certain advantages. Asynchronous signing allows a user to first verify data in a committed row before signing the row. A user can query a DBMS to verify that the row that was requested to be inserted and committed was actually committed with the specified values.

Asynchronous signing also allows more rows to be inserted into a blockchain table in less time. Generating a digital signature for data in a row entails relatively significant processing. Including the digital signature in a row as part of inserting the row would require further processing and would delay the insertion of the row. Asynchronous signing allows users to avoid this additional processing of generating a digital signature before inserting a row, thereby allowing rows to be inserted more quickly.

Unfortunately, asynchronous signing risks data integrity. There is a window of vulnerability between committing a row and signing a row that is subject to an impersonation attack. A malicious user impersonating the user that inserted a row may introduce an invalid signature, thereby sabotaging the non-repudiation that a valid digital signature would otherwise provide.

To reduce the risk of such an attack, the window of vulnerability is minimized by reducing any delay to asynchronously signing rows. Such minimization impairs the ability to shift the process of digitally signing to periods in which there is less row insertion activity or other database activity or impairs the ability to group rows into larger batches for digitally signing for more efficient processing.

BRIEF DESCRIPTION OF THE DRAWINGS

In the drawings:

FIG. 2 is a diagram depicting a blockchain table with columns for implementing an embodiment of the present invention.

FIG. 3 is a flowchart depicting a procedure for registering a digital certificate with a DBMS according to an embodiment of the present invention.

DETAILED DESCRIPTION

In the following description, for the purposes of explanation, numerous specific details are set forth in order to provide a thorough understanding of the present invention. It will be apparent, however, that the present invention may be practiced without these specific details.

General Overview

Described herein are approaches for asynchronous signing that reduce if not eliminate the window of vulnerability attendant asynchronous signing. The approaches are referred to herein as Secure-Asynchronous Signing. For purposes of exposition, the approaches are explained in the context of a blockchain table managed by a DBMS. However, the approaches may be implemented in other forms of persistent storage systems (PSS) that support transaction processing for other forms of record collections other than blockchain tables or database tables, as explained hereafter.

In a Secure-Asynchronous Signing implementation in a DBMS, when a row is inserted into a database table by a user, the user specifies a DBMS-registered digital certificate to associate with the row. The digital certificate was previously registered by the user with the DBMS. To subsequently sign a row, the user provides a digital signature. The DBMS validates the digital signature using data in the row and the public key of the digital certificate that had been associated with the row. Invalid digital signatures are detected and rejected by the DBMS regardless of how long afterward the attempt to sign the row occurs after inserting the row.

Secure-Asynchronous Signing in effect eliminates the window of vulnerability subject to impersonation attacks discussed previously. Consequently, the delay in digitally signing rows may be far less restricted. Rows may be digitally signed more efficiently, as by shifting the digitally signing of rows to periods of less activity and/or by batching greater numbers of rows together for digitally signing with improved efficiency.

Illustrative DBMS

Figure 1:
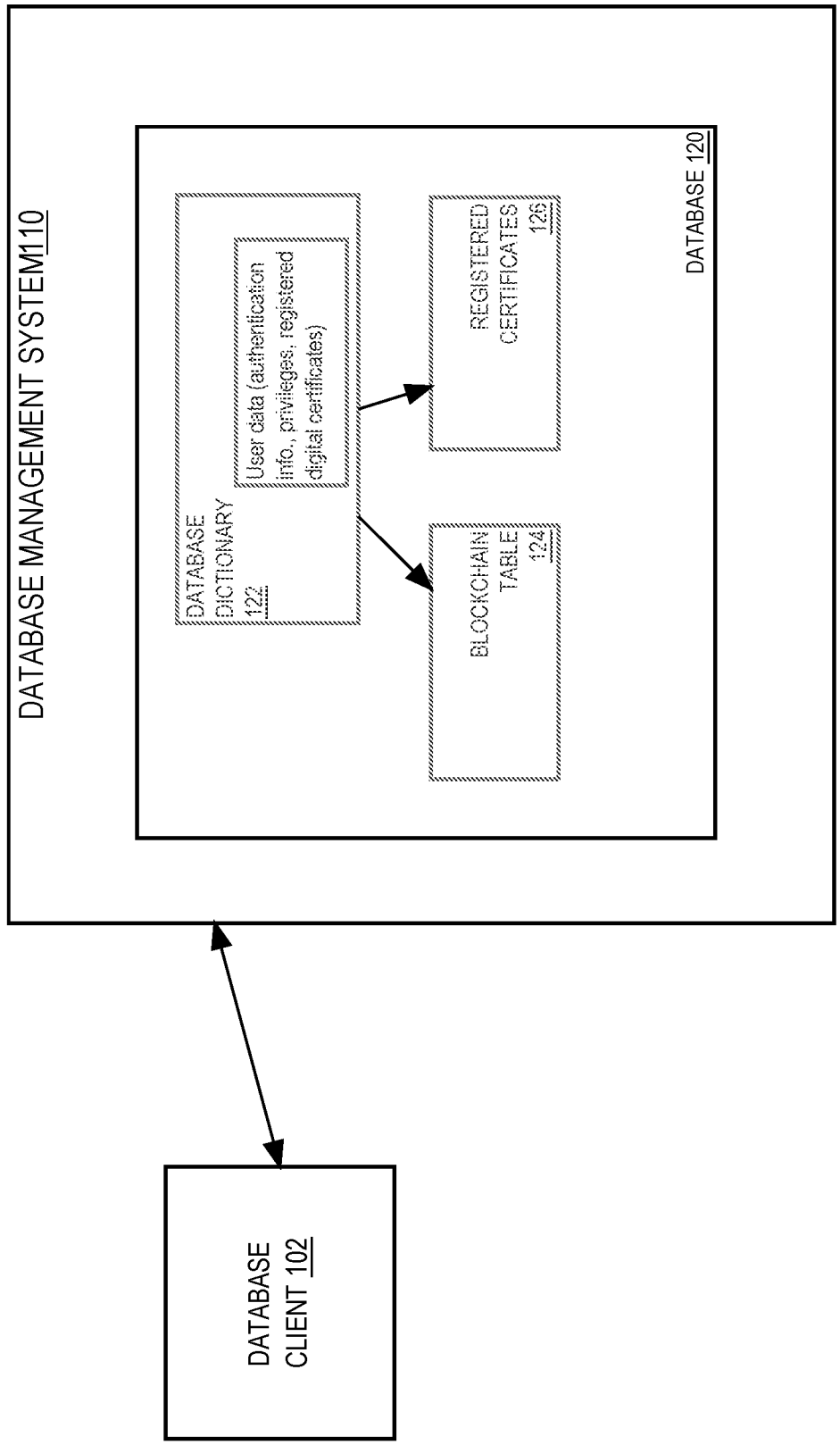
FIG. 1 is a diagram of a DBMS upon which an embodiment of the present invention may be implemented.

FIG. 1 depicts a DBMS upon which an embodiment of Secure-Asynchronous Signing may be implemented. Referring to FIG. 1, it depicts DBMS 101, which manages access to database 120.

Database client 102 is a computer process that interacts with DBMS 101 over a network, to issue database commands or invoke API functions to query and/or change data in database 120, or to alter the configuration of DBMS 101. Alternatively, database client 102 may be a process running on the same computer as DBMS 101, interacting with processes of DBMS 101 through remote procedure calls.

To interact with a DBMS, a database client, such as database client 102, establishes a session on DBMS 101. Establishing a session requires that a database client authenticate itself as a user registered with DBMS 101. For purposes of exposition, the term user is used to refer to one or more database clients that have or will authenticate themselves as the user when, for example, a database client is performing an action directed to the DBMS or is the object of action of the DBMS, or is performing an action involved in Secure-Asynchronous Signing. For example, a user invoking an API function and receiving a result from the invocation refers to a database client that has authenticated itself as the user invoking the API function and receiving the result.

Database 120 includes database dictionary 122, which defines, inter alia, database objects within database 120, which include blockchain table 124. Database dictionary 122 also defines users that may access DBMS 101, storing information about each user, including the users' authentication information and the users' privileges to perform different kinds of operations on particular database objects or to perform administrative tasks on DBMS 101.

Database dictionary 122 may store data that associates a registered user with one or more digital certificates of registered certificates 126. Each of registered certificates 126 includes a public key that corresponds to a private key, the pair of keys being usable for asynchronous encryption. The private key is used to sign content of a row, as shall be explained further in detail.

A user registers a digital certificate with DBMS 101 by invoking an API function of the DBMS 101 provided for this purpose. The invocation transmits the digital certificate to DBMS 101. In response to the invocation, DBMS 101 securely stores the digital certificate within database 120 and modifies database dictionary 122 to associate the digital certificate with a certificate ID ("identifier") that uniquely identifies the digital certificate among registered certificates 126 and associates the user with the digital certificate by generating a mapping that maps the digital certificate ID to a respective user identifier of the user.

Blockchain table 124 is a table managed by DBMS 101 using blockchain protocols. Each row corresponds to a block in the sequence of blocks in the blockchain. Using blockchain protocols, content of a row in blockchain table 124 is cryptographically linked to content in a previous row in the sequence. Data stored in a row is asynchronously signed using Secure-Asynchronous Signing. An embodiment of the present invention is illustrated using an implementation that uses a blockchain table. However, the present invention is not limited to blockchain tables.

Illustrative Blockchain Table

FIG. 2 depicts blockchain table 124 in further detail. The table name of blockchain table 124 is PAYMENTS. Each row in blockchain table 124 stores "signing data" as values stored in columns. Signing data is data that is subject to be signed or that has been digitally signed, that is, data for which a digital signature is intended to be generated or for which a digital signature has been generated.

Signing data for which a digital signature has been generated is referred to herein as signed signing data or signed data with respect to the digital signature. Signing data for a digital signature may comprise values from multiple fields or columns; each such value may also be referred to as signing data for the digital signature.

Among other columns, blockchain table 124 comprises columns SD-NAME, SD-TIME, SD-AMOUNT, DIGEST, and SIGNATURE. For a particular row in blockchain table 124, columns SD-NAME, SD-TIME, and SD-AMOUNT together constitute signing data for a digital signature that may be stored in column SIGNATURE. Database dictionary 122 defines or otherwise identifies SD-NAME, SD-TIME, and SD-AMOUNT as columns that store signing data. Columns defined in this way are referred to herein as signing columns.

The digest generated from column values in SD-NAME, SD-TIME, and SD-AMOUNT is stored in column DIGEST.

Blockchain table 124 stores blockchain metadata in various columns of blockchain table 124. These columns include column BC-SEQ, which stores blockchain sequence numbers, each of which represents a position of a block within the blockchain represented by blockchain table 124. For a particular row in blockchain table 124, the blockchain sequence number stored in BC-SEQ represents the position of the respective block of the row within the blockchain. BC-SEQ is a primary key for blockchain table 124. A row in blockchain table 124 may be referred to herein by its primary key value.

Columns BLOCKCHAIN METADATA are columns that store other forms of blockchain metadata. The kind of metadata stored in these columns is not depicted in detail in FIG. 2. Other forms of blockchain metadata may be a row hash value generated from the column values that comprise block content of a respective row, including a row hash value of the previous block in the blockchain.

A row is inserted into blockchain table 124 in append-only fashion based on the block sequence numbers stored in BC-SEQ. A row inserted into blockchain table 124 is assigned the next available number in the sequence when the row is committed. Other block metadata is also generated upon commit.

A row may be inserted using data manipulation language (DML) commands or analogous APIs that reference or specify columns and column values for the row. In general, these column values for these columns are included in the respective block content of the row.

To provide security and maintain the validity of the blockchain and digital signatures stored in blockchain table 124, a user's ability to specify the values for columns is prohibited or restricted by DBMS 101, as described further below. Such columns include block metadata columns, such as BC-SEQ, BLOCKCHAIN METADATA, as well other columns related to digital signatures, such as DIGEST, SIGNATURE, and CERTID.

Certificate ID Column and Registering a Digital Certificate

Column CERTID includes the certificate IDs of digital certificates registered by users with DBMS 101. For a particular row in blockchain table 124, the certificate ID identifies the certificate that was used to authenticate the digital signature provided by the user to sign the signing data stored in columns SD-NAME, SD-TIME, and SD-AMOUNT. A certificate ID is generated for a digital certificate when a user registers the digital certificate with DBMS 101. When a user attempts to set a CERTID column value to certificate ID, DBMS 101 validates that the certificate ID is for a digital certificate registered for the user.

FIG. 3 depicts a process for registering a digital certificate for a user. Referring to FIG. 3, a user establishes a database session with DBMS 101. (310) Establishing a database session entails the user and DBMS 101 interacting to authenticate the user credentials provided by the user. Once established, the DBMS associates the user with the database session as an authenticated user.

Next, the user sends a request to register a digital certificate with DBMS 101. (315) The request includes the digital certificate. The request may be made by invoking an API of DBMS 101, an example of which is shown below.

add_certificate(dig_certificate)

The argument dig_certificate is for passing a digital certificate to DBMS 101.

In response to receiving the request, DBMS 101 securely stores the digital certificate and generates a digital certificate ID for the digital certificate. DBMS 101 updates the database dictionary 122 to map the digital certificate ID to the user, thereby associating the digital certificate with the user. (320) The digital certificate ID uniquely identifies the digital certificate among registered certificates 126.

DBMS 101 returns the digital certificate ID to the user. (325) For example, the digital certificate ID is returned as a result of invoking add_certificate(dig_certificate).

Normalizing Signing Data

Like computer data in general, signing data can be represented using different formats for a same data type. For example, the format for a date or string stored in a column returned to a user in a query result may be different than the internal format of the string or date stored within a data block in the database.

To a cryptographic function or algorithm, instances of signing data that are represented in a different format are different instances of bytes. As described later, signing data is used both by a user to generate a digital signature and by the DBMS to validate the digital signature. If the format of signing data used by the user to generate a digital signature is different than the format used by the DBMS to validate the digital signature, then in effect, the signing data used to generate a digital signature is different than the signing data used to validate the digital signature. Obviously, a digital signature generated for signing data cannot be validated against signing data that is different.

To deal with this issue, the signing data that is used to generate a digital signature and to validate the digital signature is normalized to use the same canonical format. For strings, the canonical format may be a Unicode format, such as UTF-8, for floating point numbers, the canonical format may be a Unicode string representation of the floating point number, for dates, the canonical format may be a Unicode string representation that conforms to a standard date format, such as—'DD-MON-YYYY HH24:MI:SSxFF TZH:TZM'.

DBMS 101 normalizes signing data at various points in Secure-Asynchronous Signing, as described later. Normalizing signing data stored in the database entails DBMS 101 performing transformation operations on signing data as stored in an internal format of DBMS 101 to transform the signing data to a canonical format.

For example, string values SD-NAME may be stored in the Unicode UTF-4 format. Normalizing a string value in SD-NAME may entail converting the format of a string value from UTF-4 to UTF-8. Alternatively, SD-NAME may be dictionary encoded using integer codes that are mapped to a dictionary of strings. Normalizing a column value for SD-NAME may entail converting an integer value to the string value mapped to the integer value by the dictionary and converting the string to UTF-8 format. Normalizing a column value of SD-TIME stored in the database 120 may involve converting the column value from the internal format of the database used for times to Unicode string according a particular date format.

In addition, the data stored in database 120 may be encrypted. In this case, normalization may involve decrypting signing data using an internal private key of the DBMS 101 before performing further transformation operations.

Secure Asynchronous Signing for a Blockchain Table

Figure 4:
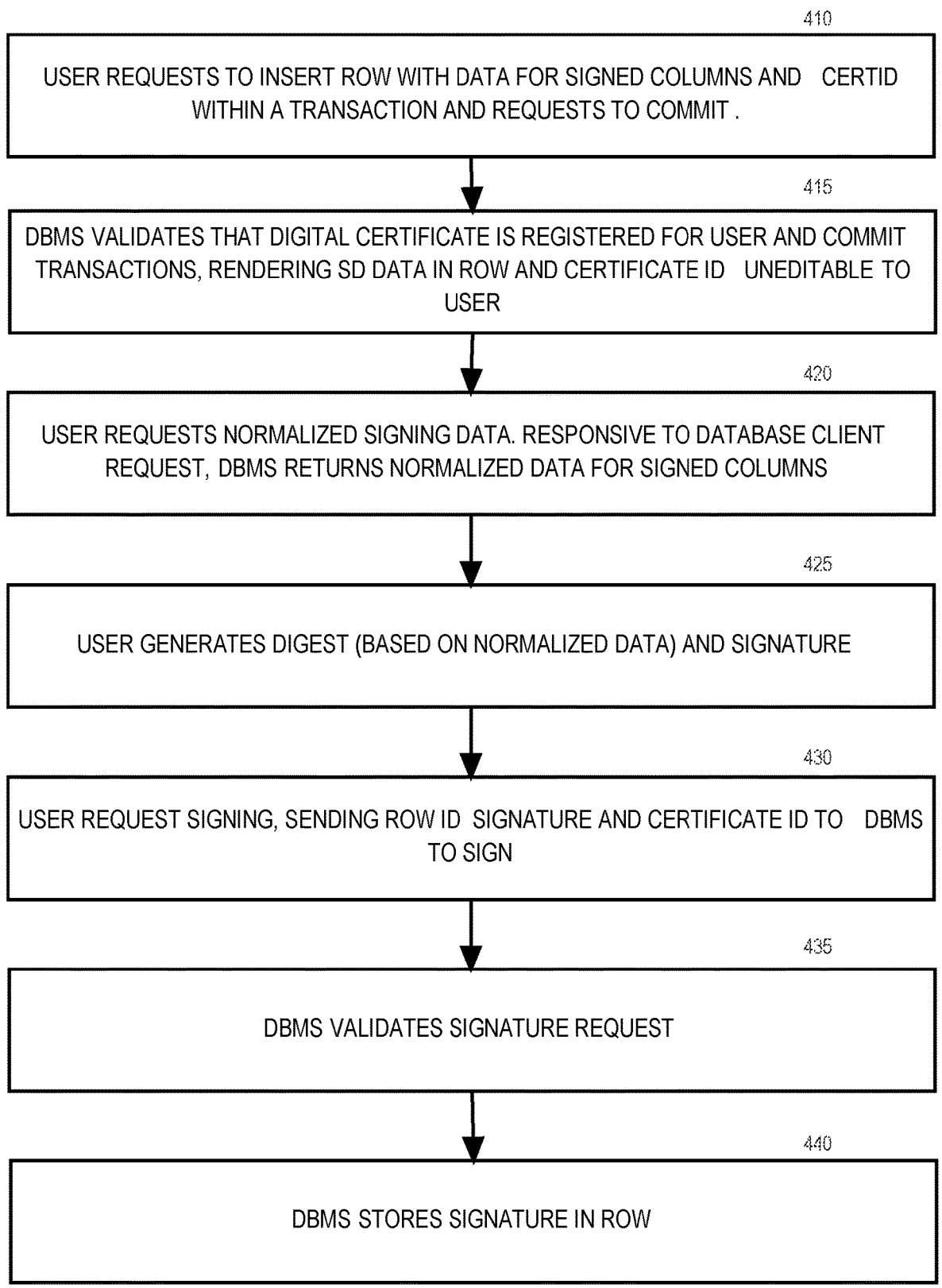
FIG. 4 is a flowchart depicting a procedure for Secure-Asynchronous Signing according to an embodiment of the present invention.

FIG. 4 depicts a procedure for Secure-Asynchronous Signing for signing data stored in a blockchain table. The procedure is illustrated using blockchain table 124. Before performing the procedure, the user establishes a database session with DBMS 101. The operations depicted in FIG. 4 are then performed.

(410) The user submits a request to DBMS 101 to insert a row in blockchain table 124 within a transaction initiated with DBMS 101. The request may be made by submitting a DML command or by invoking an API function. The request includes column values that comprise the signing data for the row. The request also includes a certificate ID identifying a digital certificate stored within database 120. The user then requests that DBMS 101 commit the insert.

In the current illustration, the user requests to insert a row by invoking the following API function.

```
Insert_BCT ("PAYMENTS", SD-NAME = "COMP A",
          ,SD-TIME = # 9/21/21 1 PM#
          ,SD-AMOUNT = 400
          ,CERTID = 1X4)
```

The arguments of the API invocation specify that the table into which to insert a row is PAYMENTS and specify the column values for the signing columns SD-NAME, SD-TIME, SD-AMOUNT. An argument also specifies a certificate ID for column CERTID.

(415) In response to the request to commit, DBMS 101 first validates that the certificate ID specified in the request is registered for the user. This operation entails examining the database dictionary 122 to determine that the certificate ID is mapped to the user. If the certificate ID is not mapped to the user, then DBMS 101 does not honor the request to commit and generates an error.

When DBMS 101 commits the insert, the signing data and certificate ID stored in the row cannot be modified by the user or other users. DBMS 101 will reject or otherwise not permit a request from a user to modify the signing columns and certificate ID.

In the current illustration, DBMS 101 validates certificate ID 1×4 then commits row 1. The column values stored in each of columns SD-NAME, SD-TIME, and SD-AMOUNT and certificate ID stored in CERTID become un-editable by users.

(420) Subsequently, the user requests normalized signing data. In response, DBMS 101 performs transformation operations needed to generate normalized signing data and returns the normalized signing data as a sequence or stream of bytes. In the current illustration, the user invokes the following API function.

Get_Normalized("PAYMENTS", BC-SEQ=1)

In response to the invocation, DBMS 101 examines database dictionary 122, determining the signing columns defined for blockchain table 124 are SD-NAME, SD-TIME, and SD-AMOUNT. In response to the determination, DBMS normalizes the column values stored in these signing columns and returns the normalized column values as a single sequence or stream of bytes to the user.

(425) After receiving the normalized signing data, the user generates a digest by applying a cryptographic hash function. Examples of algorithms executed by a cryptographic hash function include MD5, SHA-1, SHA-256, SHA-512, & WHIRLPOOL. Based on the digest, the user generates a digital signature by applying the user's private key that corresponds to the digital certificate for the row.

(430) After generating the signature, the user sends a signing request to sign the signing data of a row. The request includes the digital signature and identifies the row to sign. In the current illustration, the user invokes the following API function:

SIGN("PAYMENTS", BC-SEQ=1, SIGNATURE)

The arguments of the API function identify blockchain table 124 by the name PAYMENTS, identify row 1 by specifying the primary key value of primary key BC-SEQ. The argument SIGNATURE is for passing the generated digital signature; the value passed in is !KL89.

(435) In response to the request to sign, DBMS 101 validates the digital signature received from the user.

(440) In response to determining the digital signature is valid, DBMS 101 stores the digital signature in the row identified in the signing request.

In the current illustration, DBMS 101 accesses row 1 and retrieves the digital certificate ID 1×4, and then retrieves the public key from the digital certificate identified by the digital certificate ID, and uses the public key to decrypt the digital signature to generate a "decrypted digest". DBMS 101 then retrieves the column values from columns SD-NAME, SD-TIME, and SD-AMOUNT stored in row 1 and generates a digest using the cryptographic hash function. DBMS 101 determines this digest matches the decrypted digest.

In response to the determination that the digests match, DBMS 101 updates row 1, storing the digital signature and either of the generated digests within row 1 in columns DIGEST and SIGNATURE, respectively. The update is performed within a database transaction, which is committed.

Alternative Embodiments for a DBMS

As mentioned previously, an embodiment of the present invention is not limited to blockchain tables. Any kind of database table may be used for Secure-Asynchronous Signing, so long as the digital certificate ID inserted becomes un-editable upon committing the insert of the row, digital certificates are registered for users, and signing columns are defined for the database table by a database dictionary or are otherwise known by the DBMS, as described previously.

In an embodiment, the signing data is normalized by a process external to the DBMS (e.g user process) without need for requesting that the DBMS provide the normalized form. Developers can implement software for performing such normalization based on standards or requirements for canonical forms posted by a DBMS vendor or other publisher.

Alternative Embodiments in Other Types of Persistent Storage Systems

As mentioned earlier, Secure-Asynchronous Signing may be implemented in forms of PSSs that support transaction processing other than a DBMS. In addition to a DBMS, a PSS may be, for example, a file system (FS) or a document storage system (DOCS). In general, a PSS stores records in collections; each record in the collection includes record attributes. A collection of records may be (1) a database table managed by a DBMS, where the database table is a collection of records in the form of rows and the columns of the database table correspond to record attributes; (2) a file managed by a file storage system, where the file is a collection of records in the form of blocks or lines, and where delimited or fixed length fields of the file records correspond to record attributes; and (3) a document collection managed by a DOCS, where the document collection is a collection of records in the form of documents, where JSON fields or XML elements may be record attributes.

A DOCS may comprise one or more document storage servers, having one or more processors, memory, and persistent storage in which documents are stored. A DOCS provides access to documents through a document storage protocol that supports, among other features, CRUD-based ("create, read, update, delete") to create or insert documents and to modify documents within transactions.

Similar to a database dictionary, a DOCS includes metadata data structures that store registered users. Such data structures may be used to store registered digital certificates in association with users. Digital certificates may be registered for users using APIs furnished by the DOCS. A document in the DOCS would have signing attributes and an attribute for storing a digital certificate ID, which is treated as un-editable by the DOCS upon committing the insertion or creation of the document.

In a FS implementation, Secure-Asynchronous Signing is managed by an application specifically configured for Secure-Asynchronous Signing using transaction processing capabilities of an FS. The application may use the native user registration mechanisms of the FS to register users or use similar functionality that is implemented within the application. Digital certificates may be registered for users using APIs furnished by the application. The application uses fields in records of a file for signing attributes and a field for storing a digital certificate ID, which would be un-editable upon committing the insertion or creation of a file record.

Database Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database.

Changes to a database in a DBMS are made using transaction processing. A database transaction is a set of operations that change database data. In a DBMS, a database transaction is initiated in response to database statement requesting a change, such as DML statement requesting as an update, insert of a row, or a delete of a row. Committing a transaction refers to making the changes for a transaction permanent.

Under transaction processing, all the changes for a transaction are made atomically. When a transaction is committed, either all changes are committed, or the transaction is rolled back. DML statements or commands refer to statements that specify to change data, such as INSERT and UPDATE statement. A DML statement or command does not refer to statement that merely queries database data.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be an computer system process or thread or a user defined execution context such as a user thread or fiber. Database processes may also include "database server system" processes which provide services and/or perform functions on behalf of entire database server. Such database server system processes include listeners, garbage collectors, log writers, and recovery processes.

A multi-node database management system is made up of interconnected nodes each running a database server that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e. .java file) and the compiled version of the class (i.e. .class file).

Transaction Processing Overview

In transaction processing, changes to persistent data objects are made by transactions. A transaction is a set of operations that change persistent data objects. All the changes for a transaction are made atomically. The changes are made permanent by committing the transaction. If the transaction cannot be committed, or is aborted or otherwise not committed, the transaction is rolled back.

Transaction processing, as the term is used herein, also requires journaling. In journaling, changes made by a transaction to a persistent data object are stored in a persistent journal. A persistent journal comprises journal records that record changes made by a transaction to a data object. Each record may specify what field, column, elements, or portion of a data object were changed and the new values thereof created by the change. The old values that were replaced by the new value may also be specified.

In write-ahead journaling, journal records for changes made by a transaction are stored persistently before committing a transaction and/or to reach a prepared state. In addition, the journal can be read by other PSSs to replicate persistent data objects.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
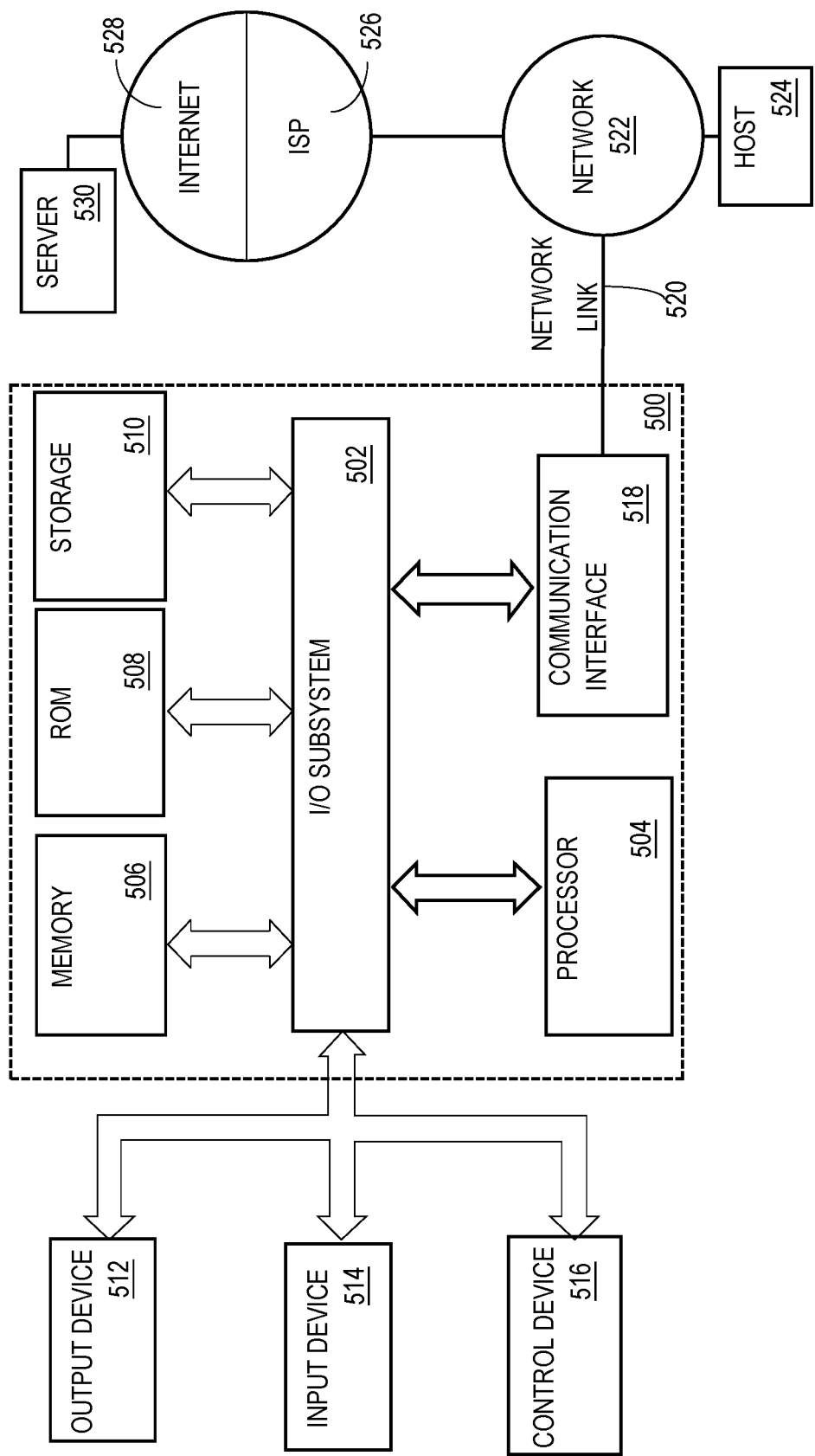
FIG. 5 is a diagram depicting a computer system that may be used to implement an embodiment of the present invention.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
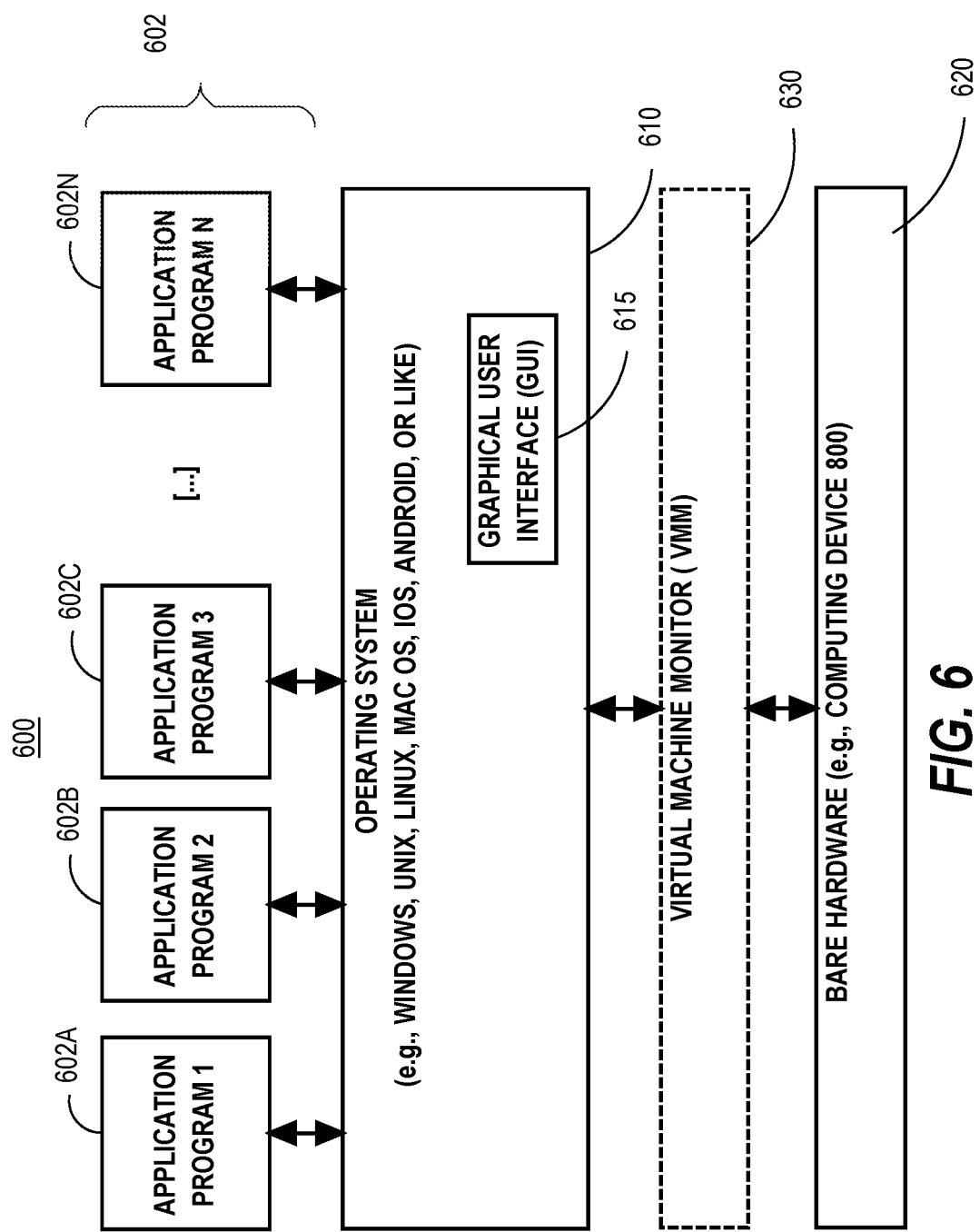
FIG. 6 depicts a software system that may be employed for controlling the operation.

FIG. 6 is a block diagram of a basic software system 600 that may be employed for controlling the operation of computer system 1100. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 1100. Software system 600, which may be stored in system memory (RAM) 1106 and on fixed storage (e.g., hard disk or flash memory) 1110, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 1110 into memory 1106) for execution by the system 600. The applications or other software intended for use on computer system 1100 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 1104) of computer system 1100. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 1100.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 1100 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   registering a digital certificate in association with a particular user, thereby associating said digital certificate with a particular digital certificate ID;
   storing a collection of records, said collection of records storing signing data in a plurality of signing attributes of said collection of records, said collection of records including a signature attribute for storing a plurality of digital signatures and a certificate attribute for storing a plurality of digital certificate IDs;
   inserting a record into said collection of records that contains a plurality of attribute values for said plurality of signing attributes and a digital certificate ID in said certificate attribute;
   committing the inserting of said record, thereby causing a set of attributes of said collection of records that include said certificate attribute to become un-editable by said particular user for said record;
   receiving a signing request for digitally signing said plurality of signing attributes of said record, said signing request including a digital signature;
   determining whether said digital signature is valid, wherein determining whether said digital signature is valid includes:
      transforming to a normalized form a plurality of attribute values of said plurality of attributes that are stored in said record, and
      determining whether said digital signature is valid based on the particular digital certificate ID and said plurality of attributes values in said normalized form; and
   in response to determining that said digital signature is valid, storing said digital signature in said signature attribute of said record.

2. The method of claim 1, before receiving said signing request:
   receiving a request for normalized attribute values for said plurality of signing attributes of said record;
   in response to said request for normalized attribute values:
      normalizing signing attribute values in said plurality of signing attributes,
      sending said signing attribute values in normalized form to said particular user.

3. The method of claim 1, wherein said signing request specifies a value for a primary key of said record.

4. The method of claim 3, wherein said collection of records stores a blockchain and said primary key holds blockchain sequence numbers.

5. The method of claim 1, wherein said set of attributes of said collection of records includes said plurality of signing attributes.

6. The method of claim 1, wherein said collection of records is a database table managed by a DBMS, and wherein said DBMS performs said committing.

7. The method of claim 6, wherein registering a digital certificate in association with a particular user includes said DBMS modifying a database dictionary of said DBMS to associate said particular user with said particular digital certificate id.

8. The method of claim 6, wherein a database dictionary of said DBMS defines said plurality of signing attributes as signing attributes.

9. A method, comprising:
   a user registering a digital certificate with a persistent storage system (PSS), wherein said PSS stores a collection of records, wherein said collection of records stores signing data in a plurality of signing attributes of said collection of records, said collection of records including a signature attribute for storing a plurality of digital signatures and a certificate attribute for storing a plurality of digital certificate IDs;
   said user receiving from said PSS a digital certificate ID that identifies said digital certificate;
   said user sending a request to said PSS to insert a record into said collection of records that contains a plurality of signing attribute values in said plurality of signing attributes and said digital certificate ID in said certificate attribute;
   said user sending a request to commit said insert of said record;
   after sending said request to commit, said user sending a signing request for digitally signing said plurality of signing attributes values of said record, said signing request including a digital signature based on a normalized form of said plurality of signing attribute values; and
   said user receiving a response to said signing request indicating said plurality of signing attributes values has been signed.

10. The method of claim 9, wherein the method further includes, before sending said signing request, said user sending a request to said PSS for normalized attribute values based on said plurality of signing attributes values.

11. The method of claim 9, wherein the method further includes said user transforming said plurality of signing attribute values to generate said normalized form.

12. One or more non-transitory computer-readable media storing one or more sequences of instructions that, when executed by one or more processors, cause:
   registering a digital certificate in association with a particular user, thereby associating said digital certificate with a particular digital certificate ID;
   storing a collection of records, said collection of records storing signing data in a plurality of signing attributes of said collection of records, said collection of records including a signature attribute for storing a plurality of digital signatures and a certificate attribute for storing a plurality of digital certificate IDs;

inserting a record into said collection of records that contains a plurality of attribute values for said plurality of signing attributes and a digital certificate ID in said certificate attribute;

committing the inserting of said record, thereby causing a set of attributes of said collection of records that include said certificate attribute to become un-editable by said particular user for said record;

receiving a signing request for digitally signing said plurality of signing attributes of said record, said signing request including a digital signature;

determining whether said digital signature is valid, wherein determining whether said digital signature is valid includes:

transforming to a normalized form a plurality of attribute values of said plurality of attributes that are stored in said record, and determining whether said digital signature is valid based on the particular digital certificate ID and said plurality of attributes values in said normalized form; and in response to determining that said digital signature is valid, storing said digital signature in said signature attribute of said record.

13. The one or more non-transitory computer-readable media of claim 12, wherein the one or more sequences of instructions include instructions that, when executed by said one or more processors, cause: before receiving said signing request:

receiving a request for normalized attribute values for said plurality of signing attributes of said record;

in response to said request for normalized attribute values:

normalizing signing attribute values in said plurality of signing attributes, sending said signing attribute values in normalized form to said particular user.

14. The one or more non-transitory computer-readable media of claim 12, wherein said signing request specifies a value for a primary key of said record.

15. The one or more non-transitory computer-readable media of claim 14, wherein said collection of records stores a blockchain and said primary key holds blockchain sequence numbers.

16. The one or more non-transitory computer-readable media of claim 12, wherein said set of attributes of said collection of records includes said plurality of signing attributes.

17. The one or more non-transitory computer-readable media of claim 12, wherein said collection of records is a database table managed by a DBMS, and wherein said DBMS performs said committing.

18. The one or more non-transitory computer-readable media of claim 17, wherein registering a digital certificate in association with a particular user includes said DBMS modifying a database dictionary of said DBMS to associate said particular user with said particular digital certificate id.

19. The one or more non-transitory computer-readable media of claim 17, wherein a database dictionary of said DBMS defines said plurality of signing attributes as signing attributes.

20. One or more non-transitory computer-readable media storing one or more sequences of instructions that, when executed by one or more processors, cause:

a user registering a digital certificate with a persistent storage system (PSS), wherein said PSS stores a collection of records, wherein said collection of records stores signing data in a plurality of signing attributes of said collection of records, said collection of records including a signature attribute for storing a plurality of digital signatures and a certificate attribute for storing a plurality of digital certificate IDs;

said user receiving from said PSS a digital certificate ID that identifies said digital certificate;

said user sending a request to said PSS to insert a record into said collection of records that contains a plurality of signing attribute values in said plurality of signing attributes and said digital certificate ID in said certificate attribute;

said user sending a request to commit said insert of said record;

after sending said request to commit, said user sending a signing request for digitally signing said plurality of signing attributes values of said record, said signing request including a digital signature based on a normalized form of said plurality of signing attribute values; and said user receiving a response to said signing request indicating said plurality of signing attributes values has been signed.

21. The one or more non-transitory computer-readable media of claim 20, wherein the one or more sequences of instructions include instructions that, when executed by said one or more processors, cause before sending said signing request, said user sending a request to said PSS for normalized attribute values based on said plurality of signing attributes values.

22. The one or more non-transitory computer-readable media of claim 20, wherein the one or more sequences of instructions include instructions that, when executed by said one or more processors, cause said user transforming said plurality of signing attribute values to generate said normalized form.

* * * * *